Figure 1A:
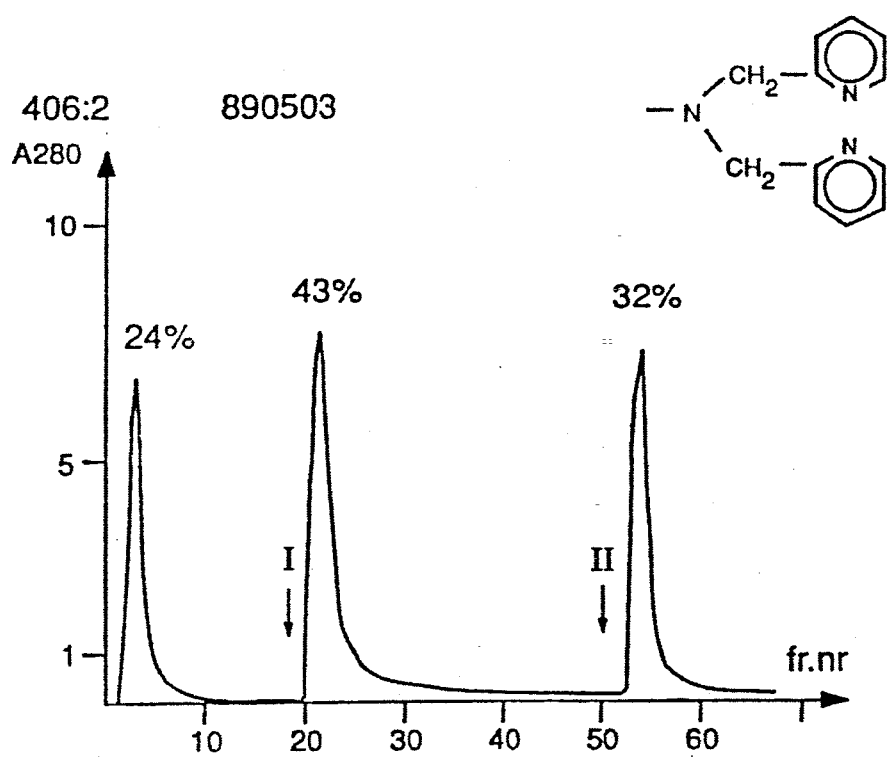

United States Patent [19]

Porath

[11] Patent Number: 5,185,313
[45] Date of Patent: Feb. 9, 1993

[54] ADSORBENT FOR METAL IONS, PROTEINS AND OTHER INORGANIC AND ORGANIC SUBSTANCES

[75] Inventor: Jerker O. Porath, Lidingö, Sweden

[73] Assignee: Exploaterings AB T.B.F., Upsala, Sweden

[21] Appl. No.: 690,900

[22] PCT Filed: Sep. 21, 1989

[86] PCT No.: PCT/SE89/00510
§ 371 Date: Jun. 17, 1991
§ 102(e) Date: Jun. 17, 1991

[87] PCT Pub. No.: WO90/07376
PCT Pub. Date: Jul. 12, 1990

[30] Foreign Application Priority Data

Dec. 30, 1988 [SE] Sweden ............... 8804701

[51] Int. Cl.⁵ ............................................. B01J 20/26
[52] U.S. Cl. ..................................... 502/402; 502/404
[58] Field of Search ....................... 502/402, 404

[56] References Cited

U.S. PATENT DOCUMENTS

| | | | |
|---|---|---|---|
| 4,144,190 | 3/1979 | Bowes et al. | 502/402 |
| 4,330,440 | 5/1982 | Ayers et al. | 525/54.31 |
| 4,443,366 | 4/1984 | Sakagami et al. | 260/112 R |
| 4,673,734 | 6/1987 | Tayot et al. | 502/404 X |
| 4,883,598 | 11/1989 | Riethorst et al. | 502/404 X |
| 4,897,467 | 1/1990 | Porath et al. | 502/402 X |
| 4,969,995 | 11/1990 | Jackson et al. | 502/402 X |

FOREIGN PATENT DOCUMENTS 245222 11/1987 European Pat. Off. .
2160540 12/1985 United Kingdom .

*Primary Examiner*—Patrick P. Garvin
*Attorney, Agent, or Firm*—Armstrong & Kubovcik

[57] ABSTRACT

The invention relates to an adsorbent agent with special advantages to heavy metals, proteins, etc. and is based upon a ligand with an atom sequence (A): N—C—C$_n$—N, wherein n is 1 or 2, and one terminal, a ring atom N in a heteroaromatic ring system, together with a proximal ring atom C forms a first terminal. The second terminal —C$_n$—N— can be an integral part of a heteroaromatic ring system with one or more heteroatoms and through a crosslinking bridge D is attached to P. The first terminal N—C— can be included in a pyridine or imidazole core. The polymer P is organic and hydrophilic such as polysaccharide, polyvinylalcohol, polyacrylamide, polyacrylester, polyethyleneimide or derivatives thereof, and can also be immobilized by crosslinking, binding or adsorption or inclusion in an inorganic bearer.

17 Claims, 1 Drawing Sheet

ADSORBENT FOR METAL IONS, PROTEINS AND OTHER INORGANIC AND ORGANIC SUBSTANCES

The present invention relates to an adsorbent for metal ions, proteins and other substances and indicates methods for adsorption of heavy metals from water solutions.

When certain heavy metals, such as copper, nickel and zinc, are adsorbed to the adsorbent according to the invention, a product is formed which in turn takes up organic substances from a water solution The metal ions immobilized on the product may be used for separation of proteins from each other in blood serum, extracts from animals and plants, etc.

Heavy metals can be concentrated from diluted solutions by adsorption, whereby the solutions will be liberated from the metal ions more or less effectively. This is of importance in the hydro metallurgy, but also in the control of the environment, where heavy metal pollution is an increasing problem, as well as in medical science relating to acute or chronic, poisoning. Heavy metal ions immobilized to an insoluble bearer can also be used as an adsorbing agent for organic substances, and, where applicable, for its catalytic properties Metal ions attached to high molecular soluble polymers also have potential new fields of application.

Metal adsorption can be carried out on ion exchangers, and metal ions can be separated from each other effectively In the hydro metallurgy among others metal chelating adsorbents are used, in which the chelate forming group often comprises dithiocarbamate, hydroxamatphenol or ketoenolate groups. Usually the chelate forming adsorbents are based upon insoluble hydrophobic bearers, e.g. cross-linked polystyrene and for analytical purposes polystyrene derivatives of immino diacetate are suitable.

Immino diacetate inserted in a hydrophilic bearer, such as agarose, is also used for chromatographic separations, IMAC (immobilized metal ion affinity chroamtography) or metal chelate affinity based protein chromatography Other gel materials with other chelate forming groups have also been used.

It is of importance that the chelate forming groups on the one hand bind certain heavy metals, and on the other hand have a high selectivity. According to a certain aspect of the invention with only nitrogen in the ligand, a high affinity for mercury, cadmium and copper will be reached, but a low affinity for iron. In this state with a high relative affinity for the above mentioned metals, they can thus be concentrated effectively from water solutions containing iron, whereby alkali metals and earth alkali metals or aluminium do not disturb noticeably.

The adsorbent according to the invention is characterized by the structure P-D-L, wherein P is a polymer, D a cross-linking bridge connecting P with a ligand L comprising one or more heteroaromatic ring systems with at least one ring nitrogen, N, which together with a proximal ring atom C establishes a terminal in an atom sequence A: N - C - $C_n$- N, where n is 1 or 2, and the other terminal of which - $C_n$- N - also can be included in a heteroaromatic ring system with one or more hetero atoms, and via D is bound to P, or where - Cn - N is included in an exocyclic side group of the heterocyclic ring and bound to the polymer P via D.

The ligand structure comprises a nitrogenic ring of aromatic character. Especially effective to bind heavy metals are pyridine and imidazole. These ring systems as such have low affinity to heavy metals such as e.g. copper ions, but the affinity may be magnified considerably by suitable substitution.

In the ligand according to the invention a side group is inserted in 2-position to the ring nitrogen with a nitrogen group in the side chain, separated from the ring nitrogen by an atom sequence of 2 or 3 carbon atoms. This substitution causes a 5- or 6- membered chelate ring to be established with a heavy metal with pronounced affinity to nitrogen atoms (metal ions of "hard" or "intermediate" type).

A heteroaromatic ring

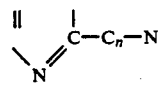

with the atom sequence A, where n=1: $N^1=C^2-C^3-N^4$ can give a metal chelate

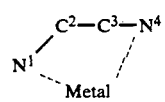

and with the atom sequence A, where n=2: $N^1=C^2-C^3-C^4-N^5$

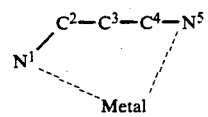

a metal chelate

Preferably the metal is "soft" or "intermediate" such as $Cu^{II}$, $Ni^{II}$, $Cd^{II}$, $Hg^{II}$ or $Co^{II}$. The affinity of $Fe^{III}$ as well as of $Al^{III}$, $Ca^{II}$, and "hard" metal ions is inconsiderable or non-existent, which is of advantage in further shaping of ligands with selectivity for the soft metal ions.

In the bidentate structures above, there are two atoms $N^1$ and $N^{4,5}$ which will bind to the metal ion. As is often the case, if a nickel ion can bind coordinating atoms such as N or S in six positions, and thus is hexacoordinated valent but dispositive, 3 structures A can be coordinated

but if N⌒N directly or indirectly is fixed in a polymer and the distances between all N⌒N are sufficiently big, only an incomplete complex will be secured. The metal will be unsaturated with regard to N⌒N, and that is used in IMAC. The strength by which a metal ion will be adsorbed is dependent upon if N⌒N stands close together, when in fact 2, or which is hardly likely 3 N⌒N, are coupled to a metal ion, which then of course is bound stronger. The environment around N⌒N alters the affinity of the metal, and usually the envoronment, the polymer and the bridge to the polymer constitutes an obstacle to the interaction.

For metal adsorption the affinity shall be high, that is a strong binding and a high selectivity, but at the same time the metal ion shall be easy to desorb. To remove e.g. Hg or Cu from water, the adsorbent may not be saturated by iron or aluminum.

The adsorption capacity can be strengthened so that more of one metal ion is adsorbed upon a given amount of adsorbent, as well as the selectivity also can be strengthened by inserting further coordinating atoms, especially N and S (in thiol). The strengthening will be makedly more effective if these atoms are inserted so that 5- or 6-rings can be formed together with the coordinating atoms, e.g.

$$-N-C-C-N- \quad -N-C-C-C-N-$$
$$-N-C-C-SH- \quad -N-C-C-C-SH-$$

5-and 6-rings according to the invention form metal chelates which are stronger than complexes with two N-atoms in other positions. As N is an integral part of a ring, e.g. pyridine or imidazole the metal chelate is more stabilized and if the heteroaromatic ring is imidazole very stable complexes are obtained.

Here two structures are conceivable

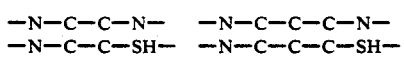

A ligand of picoline amine type can establish the copper chelate structure

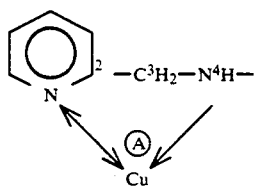

I

Still stronger chelates are acquired if the ligand has two pyridine cores

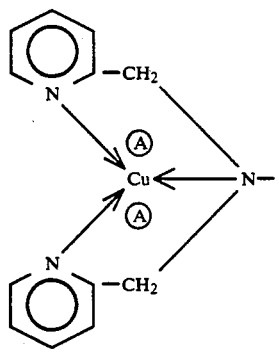

II

The hydrogen proximal to the nitrogen in I can advantageously be substituted by some other chelate forming group, e.g. carboxy methyl, and then a double ring chelate can be established

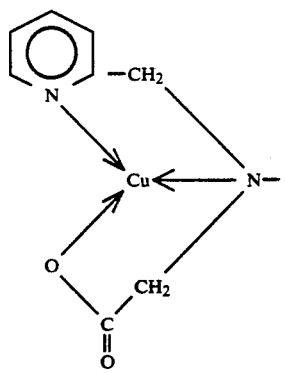

III

Often five-membered rings in chelates are very stable, as well as sometimes also six-membered rings A double ring chelate is acquired from I by processing with epichlorohydrin and subsequent reaction with sodium hydrosulfide, and metal saturation will produce an interesting variant according to the invention, which together with metal is able to bind two nitrogen atoms and one sulfur atom.

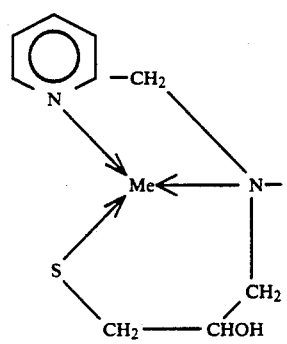

IV if NaSH is exchanged for NH3 is produced

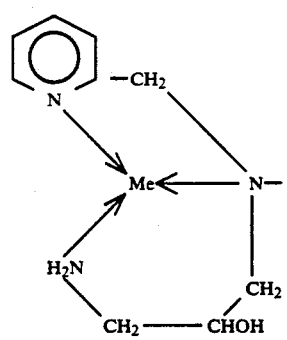

V

If NH3 is exchanged for an amine an alkyl derivative is procured which will also form a bichelate. If the amine is exchanged for an amino acid, e.g. glycine a further five-membered ring system can be formed. With immino diacetic acid and heavy metals such as cobalt and zinc theoretically 4-to 5-membered rings can be formed. If NH3 is exchanged for polyamine, chelates with many rings and only nitrogen as the only metal coordinating atom can be formed for instance with diethylene triamine and nickel ions

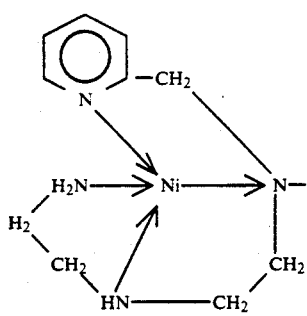

or

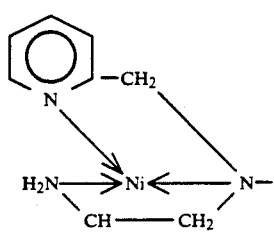

Bi- and trichelates with 2 respective 3 five- or six-membered rings can be obtained by an other form of substitution in I, e.g.

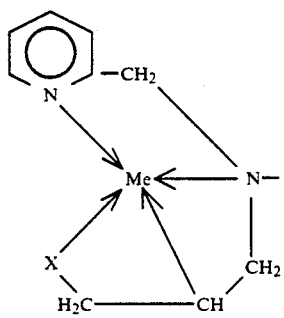

wherein X is NH₂ or SH. These ligands can be produced by alkylating V with allylbromide, brominating the allyl derivative and then treating with ammonia respective NaSH (or via Bunte Saltz and reduction).

Imidazole and imidazole derivatives can take the place of the pyridine in the previous example, but according to the invention, the side group can occupy two different positions. Formula I thus corresponds to the following structures

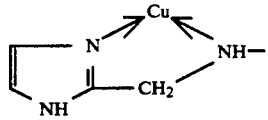

VIIIa

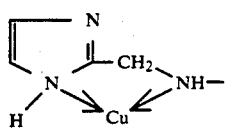

VIIIb

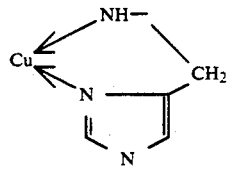

VIIIc

Among many varieties according to the invention the following ligands are suitably stated

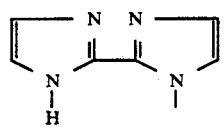

IX

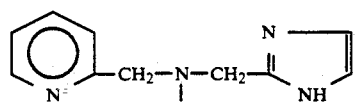

X

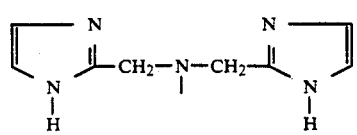

XI

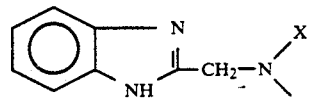

XII wherein X is CH₂COOH or $$\begin{array}{l}-CH-COOH\\ |\\ -CH-COOH.\end{array}$$

the chelate structure necessary for ring A can be obtained from two connected pyridine rings according to the following

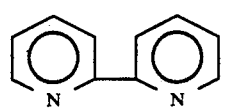

XIII

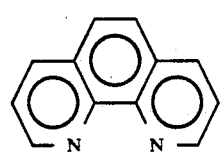

XIV but then the attaching must be done through a side chain, e.g. via amino groups in 5-aminophenantrolin

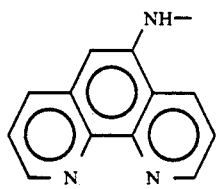

XV

XIII–XV are bidentate ligands, which cannot be strengthened by nitrogen substitution as the case is in the previous examples.

The derivatives described above, all contain the atom sequence -N -C - C - N -, wherein with the atoms numbered $-N^1-C^2-C^3-N^4-$, $N^1-C^2$ is an integral part of an heteroaromatic core, which is an imidazole or a pyridine group in the examplified cases. This heteroarmtic group is substituted in 2-position with a side group, which can be a ring too, but also an aliphatic or aliphatic-aromatic chain. Further the heterocyclin ring can be substituted or coupled to some other ring, heteroaromatic or aromatic, so that for instance the following metal coordinating structures are obtained;

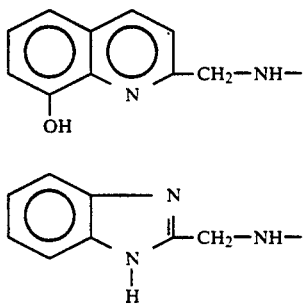

XVI

The side group in the ligand L is attached to a polymer through a crosslinker D which in the most simple case can be one single carbon atom with hydrogen. If by way of example a polysaccharide is oxidised with periodate links are formed with the structure

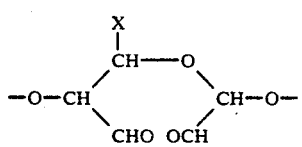

XVII wherein X is $CH_2OH$; $COOH$; $CHO$ or $CH_3$, which with picolylamine will form condensation products containing the structure

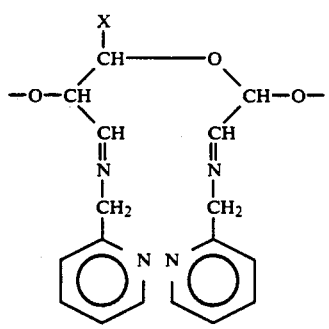

XVIII which can be reduced to

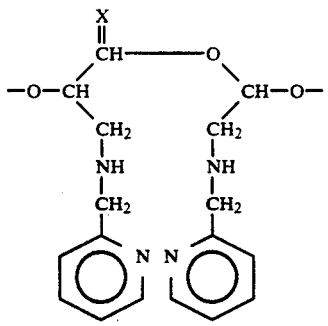

XIX

In these cases the distance group D is CH or $CH_2$.

As is shown in the preceeding examples the side group an be more complicated and further examples thereof can be stated. The polymer an be substituted with polyethyleneimine or be polyethylenimine itself, crosslinked or not crosslinked. If such an amine is treated with an aldehyde, for instance pyrol-2-aldehyde or pyridine-2-aldehyde by Schiff condensation is obtained the characteristic atom sequence $N^1-C^2-C^3-N^4$, where $N^4$ are converted primary amino groups in the amine containing polymer

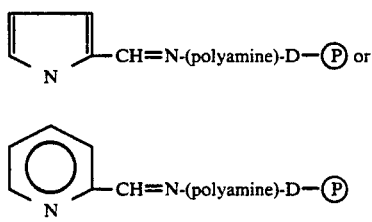

and after reduction with for instance $NaBH_4$

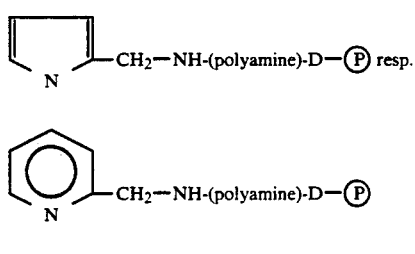

If the polyamine is treated with picolylchloride the picolyl group can be inserted at both primary and secondary amino groups, e.g.

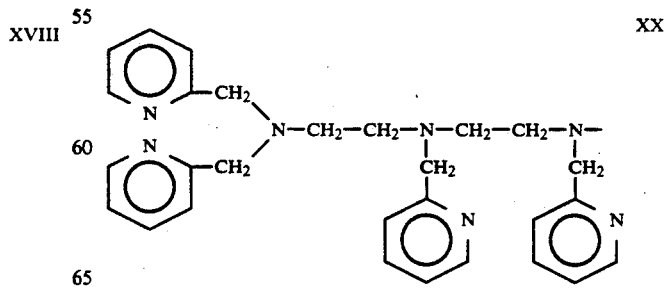

XX where repeated sequences $N^1 - C^2 - C^3 - N^4$ are obtained in every ligand or in the polyethylene amine.

Also the side group can contain derivatives of urea, thiourea, semicarbazide, biuret, etc. as well as for instance guanidine, hydrazine and hydrazine derivatives, for instance

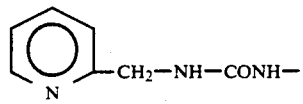

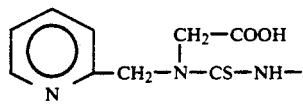

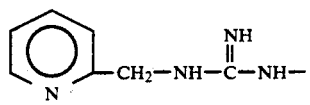

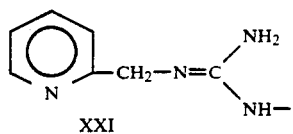

XXI

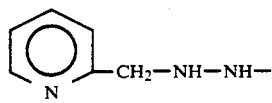

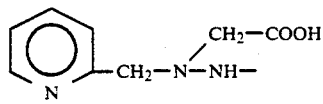

Pocolylor imide azolyl methyl groups, etc. can be inserted in the polymer too through triazine derivatives, for instance

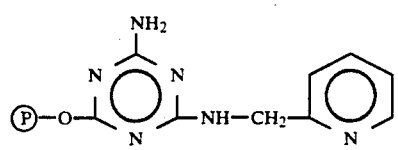

XXII and

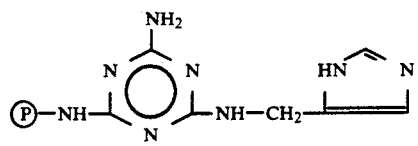

In these and similar examples the triazine structure can be interpreted as included in the ligand L or in the crosslinking bridge D.

Further the adsorbent can be strengthened in other ways too. Thus the amino group in picolylamine for instance can be substituted with an allyl group

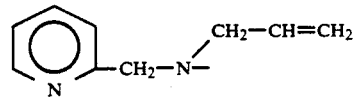

and the product thereafter be brominated. XXIII

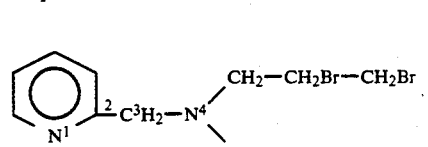

With ammonia or NaSH then amino respective SH groups can be inserted in 2- or 3-positions to N4 Many variations are possible.

After immobilisation to a polymer tris(2-aminoethyl)amine will be an excellent starting material for alkylation with Q-CH2-X, where X is Cl or Br and Q is pyridine, imidazole or some other heteroaromatic ring system, which will generate the atom sequence $N^1$ - $C^2$ - $C^3$ - $N^4$ and can form particularly strong metal ion complexes, for instance

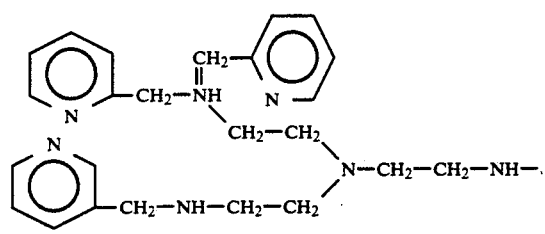

XXIV and with 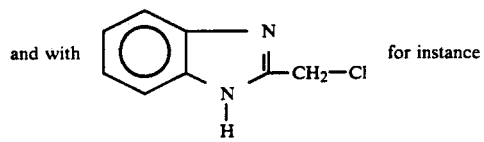 for instance

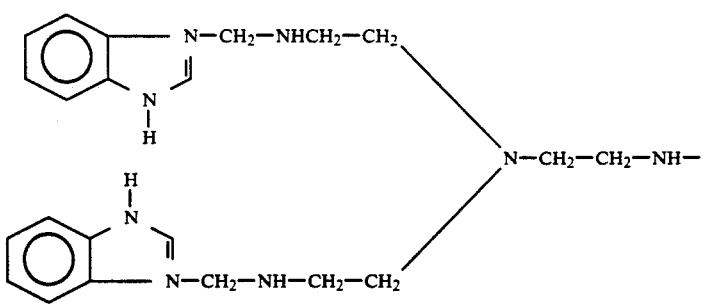

XXV

A strengthened adsorption also can be obtained by condensing 2-hydroxy benzaldehyde with picolylamine to a Schiff base and thereafter reducing and coupling to an activated polymer Ni-ions then can form complex with the ligand of the structure

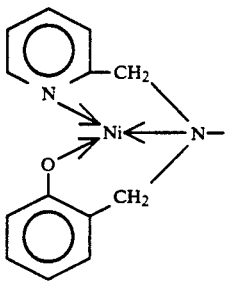

XXVI

Besides activating of the matrix with symmetric trichlorazine and direct coupling of amine to aldehyde groups sustituted in the polymer matrix this ligand can be bound in several ways such as by activating with a bifunctional reagent such as divinylsulfone, bisepoxide or halocyan, for instance BrCN OH-groups also can be transformed into active esters etc. Thus the activating reagent also can generate the crosslinking bridge With. divinylsulfone is obtained the bridge —CH$_2$—CH$_2$—SO$_2$—CH$_2$—CH$_2$—
butanediol diglycidylether glass or be mixed with or bound to magnetic particles, which simplifies the separation of the adsorbent from the surrounding solution.

For fixation of the ligand to the bearer a cheap and useful method is activation with epichlorhydrin, which gives a strong and good bond between matrix and ligand We also have supplemented with oxidation of the polyol to aldehyde groups and condensed and reduced as Schiffs base For matrixes with primary amino groups we also have coupled through dialdehydes.

Through choosing and synthesis of ligands then we have produced adsorbing agents with great applicability.

Heavy metals appear commonly in the environment, both naturally existing and as a result of human activities, and is a rapidly growing environmental problem which often disturbs the biological processes. Accumulating of the metal ions upon adsorbents is the chemically and technically most flexible method for neutralizing the heavy metals, and the adsorbents according to the present invention have proved to be able to adapt to most of the actual metals and needs. Even sheer medical applications have been possible, and tests have been made to adsorb bacteria, virus and different poisonous organic substances.

The production of adsorbents according to the invention and their properties is described more explicit by the accompanying figure and the examples of the performance All percentages are by weight.

The figure illustrates immobilization of a heavy metal

—CH$_2$—CHOH—CH$_2$—O—CH$_2$—CH$_2$—CH$_2$—CH$_2$—O—CH$_2$—CHOH—CH$_2$— XXVII or

—CH$_2$—CH$_2$—O—CH$_2$—CH$_2$—CH—CH$_2$—O—CH$_2$—CHOH—CH$_2$—
$\quad\quad\quad\quad\quad\quad\quad\quad\quad\quad\quad\quad$|
$\quad\quad\quad\quad\quad\quad\quad\quad\quad\quad\quad\quad$CH$_3$ We have investigated a number of different polymers in regard to their capacity as bearer materials for different uses. Generally the bearer material must endure the chemical and physical strains from regenerating of the adsorbent after saturation with metal ions. For treatment of industrial waters the bearer material, the matrix, must be cheap, whereabout more expensive materials can be considered for laboratory and medical uses As examples of practically usable, soluble or insoluble bearer materials can be mentioned cellulose powder, filter paper, cotton and "wettex", crosslinked starch products and other crosslinked polysaccharides, for instance agar, agarose, crosslinked polyols such as polyvinylalcohol, crosslinked polyacrylamide, toilet sponges, etc. Advantageously the polymer also may be covalently bound to an inorganic bearer such as silica or on a product according to the invention with dipicolylamine-Cu$^{++}$as the ligand with an N content of 3,48% and the amount of ligand 829 $\mu$mol/g dry gel.

A chromatographic column with 1 cm diameter was filled with 2,5 g dipicolylgel, 50 $\mu$M ligand/ml gel according to Example 1, and charged with copper ions. The bed was washed with a buffer solution containing 50 mM Na$_2$HPO$_4$ and 0,5 M NaCl (to suppress ion exchange) and a pH adjusted to 7,6.

NaCl was added into 2 ml human serum to a molarity of 0,5 and was filtered into the bed. The chromatogram was formed when the following solutions passed the bed in a rate of 25 ml per hour.

I  50 mM NaH$_2$PO$_4$, pH 7,6 with 0,5 mM NaCl,equilibrium buffer,

II  0,5 M sodium acetate, pH adjusted to 5,5 by adding 0,5 M NaCl.
III  50 µM imidazole, 50 µM $NaH_2PO_4$ +0,1 M NaOH to pH 7,6 and with 0, 5 M NaCl added.

Figure 1B:

FIG. 1 shows the chromatogram obtained when the eluating agent was changed as indicated by the arrows. The amount of protein was measured with a spectrophotometer by the absorption at 280 nm.

To get a conception of the selectivity of the protein adsorption a gel electrophoretic analysis was made. FIG. 2 is a gel electrophorethgram illustrating a clear dividing of the serum proteins in three distinct groups. A more effective purification of the proteins can be obtained by gradientally changing of the concentration of the eluating substances (hydrogen ions, imidazole and phosphate).

EXAMPLE 1

45 ml water, 100 ml 4 M NaOH, 0,86 g sodium boron hydride and 18/75 ml epichlorhydrine were introduced into 300 g water swollen, 6 % agarose (Sepharose 6 B ®) in a 2 l round flask. After stirring 2 hours at ambient temperature, further 100 ml 4 M NaOH and 100 ml epichlorhyann were added. After reaction over night at ambient temperature, the epoxidated agar product was washed with water until a neutral reaction was obtained.

To 40 g epoxidated agarose in a 500 ml round flask was introduced 35 ml 1 M $Na_2CO_3$ and 1 ml picolylamine. After reaction 70 hours at ambient temperature, the gel product was washed succesively with water, 0,1 M acetic acid and finally water.

The product was tested in regard to adsorption capacity with solutions of Fe(III)chloride, Cu(II)chloride and Ni(II)sulfate. The copper ions were stronger adsorbed than the nickel and iron ions The capacity was about 30 µmol Cu(II) per-ml gel.

EXAMPLE 2

Into 20 g picolylamine gel according to Example 1 was introduced 15 g bromine acetic adid dissolved in 35 ml 3 M NaOH and the pH was adjusted with solid NaOH to 10,5. 35 ml 1 M sodium hydrogen carbonate with pH 10,5 was introduced and the suspension shaken for 15 hours at ambient temperature. The gel product was washed with water, 0,1 M acetic acid and water in their proper turns The carboxy methylated picolylamine strongly adsorbed copper ions. As distinguished from the gel according to Example 1 fixed Cu(II) ions were not eluated by 1 M glycine, pH 8.

EXAMPLE 3

To 10 g picolylamine agarose according to Example 1 was added 0,4 ml picolylchloride dissolved in 20 ml 1 M $NaHCO_3/Na_2CO_3$, pH 10,0 and was shaken att 70° C. for 1 hour. The gel was washed as in Example 1.

The lylamme gel fixed copper ions stronger than the picolylaminegel and got another color tint, more blue green than blue Divalent copper ions, $Cu^{2+}$, were fixed to all the three gels in water solution according to the Examples 1-3. Washing with 1 M glycine resulted in that the copper on the gels according to Examples 1 and 3 was eluated, whereas the blue zone on the gel according to Example 2 remained stationary. Similar tests were made with nickel and cobalt salts. These metal ions were adsorbed too, but weaker than copper ions.

A comparison between carboxymethyl-picolylamine-agarose, "CMP"-agarose, and iminodiacetate-agarose, "IDA"-agarose, was made with regard to the capability to adsorb serum proteins and a definitive difference was noticed. The CMP-agarose not only gave a sharper separation, but the protein pattern was also different from the results from IDA-agarose with identical test conditions.

EXAMPLE 4

(Picolyl-ethylenediamine)

Into 10 g cotton was introduced 30 ml 0,8 M NaOH and 3 ml butane bis-glycidylether. After 20 hours at 27° C. the cotton was separated and washed with water, Into the epoxidized cotton was introduced 35 ml 0,2 M $Na_2CO_3$ adjusted to pH 10,5 with NaOH. 1 g dipicolyl ethylenediamine and 35 ml distilled water were heated to 70° C. and the clear solution was added to the cotton with the sodium hydrogencarbonate solution and was shaken at ambient temperature during about 70 hours. The product was washed with water, 0,1 M acetic acid and finally water, and got a strong blue color in contact with copper chloride solution. Only to a small extent the cotton was decolored by 1 M glycine.

EXAMPLE 5

0,5 g bis-(2-aminoethyl)-sulfide was dissolved in 30 ml 1,0 M $NaHCO_3$ buffer, pH 10,5, and 25 g oxirane activated agarose according to Example 1 was added After shaking over night the gel was separated and washed with water, 0,1 M HAc and finally water.

The gel adsorbed Cu(II) ions but rather poorly The gel was piocolylated according to Example 1, and thereafter the picolyltreated gel was tested with Cu(II) and adsorbed the copper ions much better.

EXAMPLE 6

To 25 g epichlorhydrine treated agarose according to Example 1 was added 0,5 g 2-aminoethyl-2-pyridine dissolved in 30 ml 1 M sodiumhydrogencarbonate buffer, pH 10,5. After shaking at ambient temperature over night the gel adsorbed copper ions.

EXAMPLE 7

75 g epoxiagarose according to Example 1 was treated over night at ambient temperature with 3,5 g aminomethylimidazole dissolved in 80 ml 1 M $Na_2CO_3$ and was washed as in Example 1. After washing as in the other examples the product was tested in regard to the capability to adsorb copper and nickel ions. Both ions were strongly adsorbed on the gel.

The gel was carboxylated och treated with picolylchloride analogous to Examples 2 and 3, and the carboxymethylated gel adsorbed Cu(II) strongest when 1 mol glycine was used as eluent.

EXAMPLE 8

(Pico EDA-tris acryl)

100 g crosslinked polyacrylate containing hydroxyl (Trisacryl Fb 2000, IBF) was mixed with 100 ml 1 M NaOH and 10 ml epichlorhydrine, and was heated 1 hour at 40° C., whereafter further 10 ml epichlorhydnn was added. The suspension was left alone 1 hour at 40° C. and then the gel was washed with 0,1 M $Na_2CO_3$ and water.

The gel was divided in two parts and each part was mixed with 75 ml 1 M $Na_2CO_3$ and 2,5 g picolylchloride. The two parts were stirred, one for 20 hours and the other for 5 days. The gels were washed as in Example 1. The gel treated for a shorter time took up 39 μmol Cu(II) and the gel treated for 5 days 58 μmol. The gels were substantially blue colored. About half of the copper was eluated with 1 M glycin and the remainder was desorbed with 0,2 M ethylene diamine tetraacetic acid (EDTA).

EXAMPLE 9

30 g epoxidated 6 % agarose was washed with 0,2 M Na$_2$CO$_3$ and 0,3 g 1,2-[2-(8-hydroxyquinolinyl)]-ethylene diamine in 25 ml water was added. The suspension was heated to 95° C and held at this temperature for 2 hours. The gel was washed with water, ethanol, acetone, water, 20 % HAc and water in their proper turns.

23 μmol Cu(II) was adsorbed per ml gel, and the copper was not eluated by EDTA.

EXAMPLE 10

5 g polyacrylamide with epoxigroups as reactive substituents (Eupergit ®) was silted up in 25 ml 1 M Na$_2$CO$_3$ and 0,23 g 2-aminomethylimidazole was added. After reaction for 20 hours the gel was separated and washed with water, diluted acetic acid and finally water as in the earlier examples. Copper ions were adsorbed effectively, but were suppressed by 1 M glycine, pH 8,0.

EXAMPLE 11

5 g Eupergit ® was treated as above but with 0,15 g picolylamide instead of 2-aminomethyl imidazole. The product had similar properties as the 2-amino-methyl imidazole gel.

EXAMPLE 12

1 g silica gel with attached polyethyleneimine was silted in 5 ml 1 M Na$_2$CO$_3$ and 30 μl picolylamine was added. After reaction for 12 hours the gel was washed with diluted acetic acid and water. Copper ions were adsorbed strongly, which was shown in that the gel got a very dark blue color, which only to a small extent could be removed by 1 M glycine.

EXAMPLE 13

Synthesis of carboxymethyl-picolylamine gel through butanediol-bis-diglycidylether activation.

To 100 g 6% agarose was added 100 ml 0,6 M NaOH, pH 10,5 and picolylamine in the following amounts a) 0,56 ml, b) 0,14 ml c) 0,07 ml d) 0,035 ml e) 0,0175 ml and f) 0,009 ml.

After the samples had been shaken in a water bath over night whereupon their capabilities of taking up copper ions were tested in water solution and were: a) 0,53% b) 0,331 % c) 0,215 % d) 0,014% e) 0,98% and f) 0,043%.

The gel was carboxymethylated at ambient temperature with 29 ml of a solution of 19 g bromine acetic acid, 44 ml 3 M NaOH, 44 ml 1 M NaHCO$_3$ and pH adjusted to 10,5. The carboxymethylation was made over night with shaking in an E-flask.

A qualitative study of the strength of the copper ion bond to the picolylamine and carboxymetylated picolylaminogels was made. The copper fixed to the first gel was eluated at a lower concentration of glycine included in the buffer (0,1 M Tris HCl, pH 7,8) than in the later gel.

EXAMPLE 14

Synthesis of carboxymethylated picolyaminogel through divinylsufoneactivation

To 100 g drysucked 6% agarose was added 100 ml of 0,5 M Na$_2$CO$_3$ and 5 ml divinylsulfone and the mixture was shaken over night at ambient temperature. The gel was washed and divided into 6 samples of 19 g each. Each sample was silted in 20 ml 0,5 M NaHCO$_3$-buffer adjusted to pH 10,5, and was treated with the following amounts of picolylamine: a) 0,76 ml, b) 0,19 ml, c) 0,09 ml, d) 0,048 ml, e) 0,024 ml and f) 0,012 ml.

Carboxymethylation was made with 20 ml bromine acetic acid solution per sample according to Example 13.

The capability to take up copper ions was determined and was: a) 1,59% b) 1,17% c) 1,02% d) 0,66% e) 0,28% and f) 0,13%.

EXAMPLE 15

Bis-(2-pyridylmethyl)-aminogel produced by an other method than the gel of Example 14

A. To 100 g 6 % agarose (Sepharose 6B) was added 25 ml water, 33 ml 4 M NaOH, 0,3 g sodium boron hydride and 1 ml epichlorhydrin in a 1 l round flask provided with openings for stirrer and two drop funnels with 33 ml NaOH and 33 ml epichlorhydrin. The suspension was stirred for 2 hours at ambient temperature, whereafter the solutions in the drop funnels were introduced into the suspension for further 2 hours. The reaction was allowed to continue over night, whereafter the gel was taken up in a funnel with glass filter and washed.

To 20 g of the epichlorhydrin activated gel was added 1,48 ml bis-(2-pyridylmehtyl)-amine (dipicolylamine) in 2 ml ethanol and 20 ml 1 M Na$_2$CO$_3$. The mixture was shaken at ambient temperature for 92 hours.

B. 100 ml 1 M Na$_2$CO$_3$ and 4 ml picolylamine were added to 40 g epoxidated agarose according to A. After 24 hours reaction time at ambient temperature and stirring the gel product was taken up on a filter and washed.

To 50 g picolylamine gel were added 0,9 g picolylchoride 30 ml ethyleneglycol and 50 ml 1 M Na$_2$CO$_3$ and adjusted to pH 11. After hours on water bath at 80° C. the suspension was allowed to cool down and left over night. The product was washed with water, 10% acetic acid and water.

Both A and B adsorbed Cu(II) ions. The copper was eluated slowly by 1 M glycine.

EXAMPLE 16

Aminomethylimidazolegel and derivatives 20 g 6% agarose activated with epichlorhydrine according to Example 13 was mixed with 20 ml 0,5 M NaHCO$_3$/Na$_2$CO$_3$, pH 9,8 and ×g aminomethylimidazole shaken over night at ambient temperature whereafter the gel was treated according to earlier examples. With X =1 g, 0,4 g and 0,2 g, gels were obtained which took up 1,15%, 0,78% and 0,53% Cu(II) respectively (counted on dry gel substance).

The amnomethylimidazole gels were carboxymethylated and picolylated according to the preceeding examples The products adsorbed copper stronger than the starting material.

EXAMPLE 17

Oligoethyleneaminederivated gels 25 g bisoxirane activated gel was mixed with 30 ml 0,5 M NaHCO₃/Na₂CO₃, pH 10 and 0,1 g NaBH4 and shaken for 18 hours at ambient temperature with aminomethyl-imidazole as in Example 16. The product adsorbed Cu(II). Picolylating resulted in a strongly metal adsorbing gel.

EXAMPLE 18

110 g bisoxirane activated gel was treated with 112 ml 20% water solution of tetraethylenepentamine for 18 hours at ambient temperature. The gel contained 3,58% N counted on the dry substance and took up 26 μM Cu(II) per ml gel. The gel was decolored by 0,1 M EDTA.

The gel was carboxymethylated and picolylated as in the previous examples. The products were not decolored by EDTA.

Similar synthesises and tests were made with triethylenetetramine, pentaethylenehexamine and bis-aminoethylsulfide. All the gels adsorbed Cu(II), the hexamine derived gels strongest and the bis-aminoethylsulfide gels weakest.

EXAMPLE 19

A sheet of filter paper (Whatman 3 M) was divided in 3 pieces, each 5×5 cm. these pieces were laid in a covered, flat bowl with 200 ml 5% divinylsulfone dissolved in 0,2 M Na₂CO₃. After 18 hours the reagent solution was poured off and the paper washed. The following solutions were made:

| | |
|---|---|
| A. 100 ml 0,2M NaHCO₃ + | 0,5 g picolylaminehydrochloride |
| B. 100 ml 0,2M NaHCO₃ + | 0,5 g dipicolylamine dissolved in 10 ml ethanol. |
| C. 100 ml 0,2M NaHCO₃ + | 0,5 g 2-aminomethyl-8-hydroquinoline dissolved in 10 ml ethanol. |

One paper was immersed in every solution A, B and C. After 24 hours the solutions were poured off the papers were washed with water, alcohol and water. Pieces of the different papers were immersed in 1% solutions of nickel sulfate, iron chloride and copper sulfate. After exposing for 1 minute the papers were washed with water, 0,1 M glycine, 1 M glycine and 0,1 M EDTA. All the papers took up metal ions which were not washed off by water. The papers treated with the solutions A and B adsorbed the metal ions very strongly, but all but the iron treated papers were entirely decolored by 0,1 M EDTA.

I claim:

1. Adsorbing agent for metal ions and proteins having a structure P-D-L, wherein P is a polymer, D is a crosslinking bridge connecting P with a ligand L comprising one or more heteroaromatic ring systems with at least one ring nitrogen $N^1$, which together with a proximal ring atom $C^2$ forms a terminal $N^1 - C^2 -$ in an atom sequence A: $N^1 -C^2 -C^3 n - N^{n+3}-$, wherein n is 1 or 2, and wherein the other terminal of which, $-C^3 n-N^{n+3}-$(i) is an integral part of a heteroaromatic ring system with one or more heteroatoms and through D is attached to P, (ii) is included in at least one exocyclic side group to the heterocyclic ring and through D attached to the polymer P, (iii) is included in both a heteroaromatic ring system and at least one exocyclic side group, or (iv) is joined to two exocyclic side groups through a common nitrogen atom of said $-c^3 n-N^{n+3}-$.

2. An adsorbing agent according to claim 1, c h a r a c t e r i z e d in that $- N^1 - C^2 -$ is included in a pyridine core or an imidazole core.

3. Product according to claim 1 or 2, c h a r a c t e r i z e d in that the exocyclic side group with the crosslinking chain D has the structure

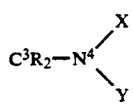

wherein R is alkyl, Y is D or X, and X is

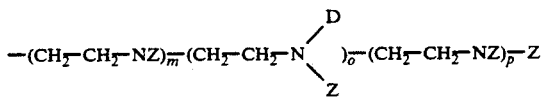

wherein Z is H, alkyl or alkyl substituted with one or more of the groups amino, hydrazino, aliphatic imino, or nitrilo, nitrogen-heterocyclic group, mercapto, carbonyl, thiocarbonyl, ether or thioether with the heteroatoms N and S separated by a chain of 2 or 3 carbon atoms in a sequence and m, o and p are 0,1,2 or more depending on the molecule.

4. An adsorbing agent according to claims 1 or 2, characterized in that the exocyclic side group with the crosslinking chain D has the structure

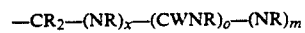

wherein R is H or alkyl, W is O, S or NH, x is 1 or 2, o is 0,1 or 2 an dm is 0 or 1.

5. An adsorbing agent according to claim 1 or 2 characterized in an aliphatic or aromatic link between D and the first terminal $=N-CH_2$ or $N=CH$ in the atom sequence A in the ligand L.

6. An adsorbing agent according to claim 1 or 2 characterized in that D contains one of the structures $-O-CH_2-CHOH-CH_2-O-(C_nH_{2n})-O-(CH_2-CHOH-CH_2)_m-O-$, $-O-CH_2-CH_2-SO_2-CH_2-CH_2-O-$, or

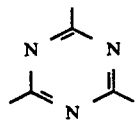

7. An adsorbing agent according to claim 1 or 2 characterized in that the polymer P is an organic, hydrophilic polymer belonging to one of the classes: polysaccharides polyvinyl-alcohol, polyacrylamide or polyacrylester, polyethyleneimid.

8. An adsorbing agetn according to claim 1 or 2 characterized in that the organic polymer has been immobilized by covalent or non-covalent binding to or included in an inorganic bearer, or by crosslinkign of the organic polymer by a bi- or polyfunctional crosslinking.

9. Method to produce an adsorbent agent for metal ions and proteins, with the structure P - D - L; wherein P is a polymer, D is a crosslinking bridge which connects P with a ligand L comprising one or more heteroaromatic ring systems with at least one ring atom N, which together with a proximal ring atom C forms a terminal N - C - in an atom sequence A: N - C- $C_n$ -N, wherein n is 1 or 2, the other terminal of which, -$C_n$- N- is an integral part of a heteroaromatic ring system with one or more heteroatoms and through D is attached to P or wherein -$C_n$ - N - are included in an exocyclic side group to the heterocyclic ring attached to the polymer P is treated with a bifunctional substance to add said crosslinking bridge D, in an alkaline water solution, whereby the gel is hydrophilic, and subsequently inserting said ligand L.

10. Method according to claim 9, characterized in that the polymer P comprises a hydrophilic polymer or by a hydrophobic polymer substituted by hydrophilic groups.

11. An adsorbing agent according to claim 7, wherein said polymer P is a polysaccharide selected from the group consisting of agar, dextran and starch.

12. An adsorbing agent according to claim 8, wherein said inorganic bearer is selected from the group consisting of silica gel, glass and magnetic particles.

13. Method according to claim 9, wherein said bifunctional substance is selected from the group consisting of halohydrin, a bisepoxide and a divinylsulfone.

14. Method according to claim 9, wherein said alkaline solution has a pH of from 8–12.

15. Method according to claim 10, wherein said hydrophilic groups are OH— or amino- groups.

16. An adsorbing agent according to claim 1, wherein exocyclic side groups of two heterocyclic rings are connected by a common nitrogen atom $N^{n+3}$ of said other terminal and are attached to the polymer P through D.

17. An adsorbing agent according to claim 1, having a plurality of said atom sequences such that a first one of said other terminal forms part of a heteroaromatic ring system and a second one of said other terminal is included in an exocyclic side group to a heterocyclic ring.

* * * * *